Aug. 4, 1959 G. H. ECK 2,898,405
LISTENING DEVICE
Filed July 13, 1955
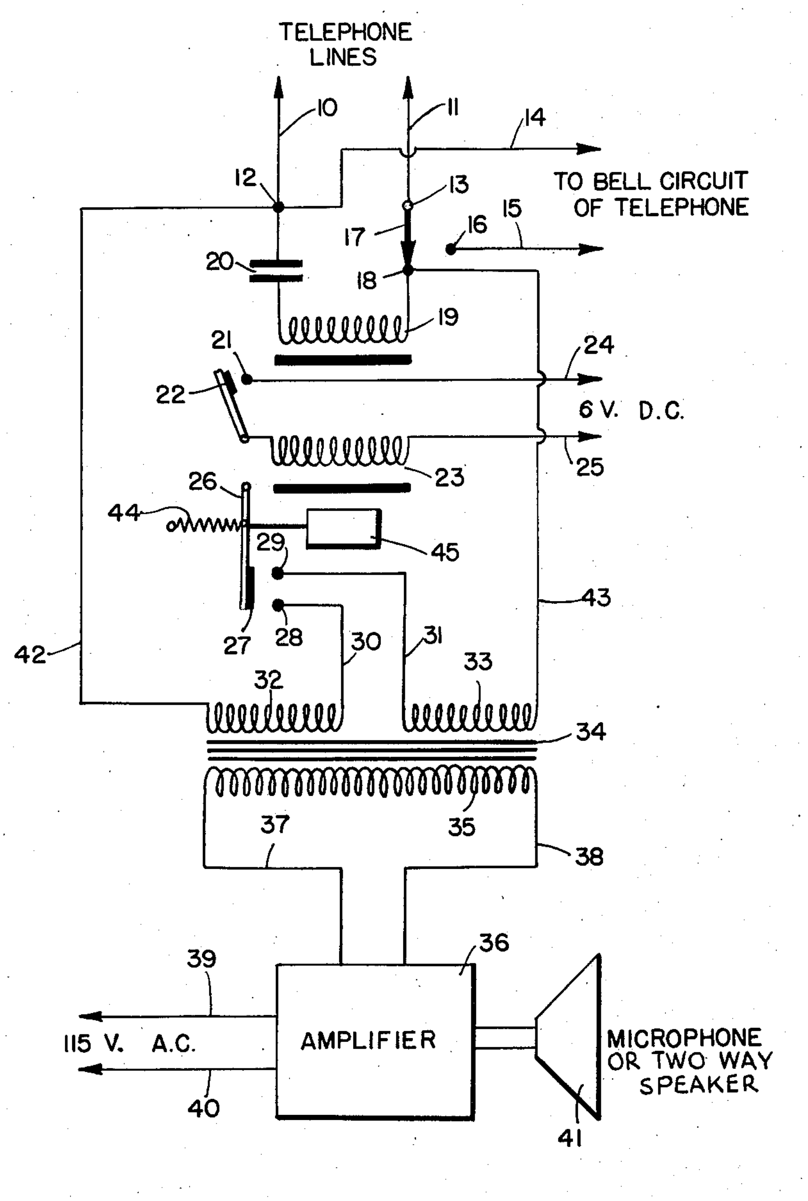
INVENTOR:
GEORGE H. ECK
BY
Rummler Rummler and Snow
ATT'YS United States Patent Office 2,898,405

Patented Aug. 4, 1959

2,898,405

LISTENING DEVICE

George H. Eck, Des Plaines, Ill.

Application July 13, 1955, Serial No. 521,727

3 Claims. (Cl. 179—1)

This invention relates to a listening device, and more particularly to a circuit arrangement useful in connection with a telephone to enable one at a calling telephone to listen in at the premises whereat a called or dialed telephone is located without the persons at such premises having knowledge thereof.

There are a number of situations wherein it would be advantageous for a person having a primary interest in the care, supervision and well-being of certain premises or people located thereat to be able quickly and conveniently to determine such conditions. For example, the owner of a place of business, such as a store or warehouse, might like to determine without visiting the premises thereof that conditions are normal—that his employees are on the job, as an instance, or that the premises are not being disturbed by unauthorized persons. Another example is where parents have left their home for a short time on the belief that their children are asleep, and would like to make certain that the children are not awake and carrying on a disturbance. It will be appreciated that the examples set forth are in no sense exhaustive, and that there are many other instances where similar knowledge would be desirable.

Today, almost every place of business, and substantially all homes, are provided with a telephone. It would be advantageous if the telephones which are so prevalent could be used as a means for determining conditions, such as those set forth, at the home, place of business, etc. of an interested person, for this would enable him to quickly and easily ascertain the information he wants—for no matter where he is located, a telephone is nearly always convenient thereto. While the use of a telephone would, for the most part, limit an interested person to an audible inspection, this would be sufficient in most cases. For example, any disturbance created by children would undoubtedly be accompanied by a great deal of sound, and similarly the presence of unauthorized persons on certain premises, or the carrying on of employees that should be working, would be attended with audible or sound indications.

There has long been a need for a means permitting one who is away from his home or place of business to quickly, easily and conveniently survey the premises thereof to determine whether everything is in good order, and it is an object of this invention to provide such a means. Another object of the invention is in the provision of means adapted to be associated with a telephone to permit one calling or dialing a given phone, to listen in at the premises on which the telephone is located and determine by audible indications or the lack thereof whether conditions are in good order.

Still another object is that of providing a listening device in combination with a telephone that can be selectively made operative, and that will enable a person dialing such a phone to listen in on what is going on at the premises thereof without the phone, when it is dialed, signalling the listening of the interested person, whereby people at the premises of the called phone will have no knowledge that their actions are being observed audibly by an interested person. A further object is to provide a listening circuit in combination with a preselected telephone that can be made operative and inoperative selectively, and when operative is actuated when the number of the phone is called and places on the telephone lines all sounds picked up at the location of the dialed phone without signalling the dialing of the phone. Additional objects and advantages will become apparent as the specification developes.

An illustrative embodiment of the invention is shown in the accompanying drawing in which the single figure thereof is a schematic circuit diagram of a listening device embodying the invention.

The listening device, as has been brought out, is adapted for use in conjunction with a conventional telephone. For purposes of simplfying the drawing and the description, a complete telephone circuit has not been illustrated in the drawing. Since telephone circuits are well known in the art, it is believed unnecessary for purposes of adequately describing the present invention to set forth such a circuit in detail. Further, a telephone circuit per se forms no part of this invention. The drawing does illustrate the lines over which voice transmissions are carried to and from the telephone, and over which the dial signal initiating action of the attention circuit or bell circuit is carried. The telephone lines are designated with the numerals 10 and 11, and these lines are connected respectively to terminals 12 and 13. One lead for the bell circuit of the telephone is connected to the terminal 12, and is designated with the numeral 14. The other lead, designated with the numeral 15, is connected to the contact 16 of a switch 17 which also provides a contact 18. That is to say, the switch 17 is a two-position switch and may be set so as to connect the contact 16 with the terminal 13, or the contact 18 with the terminal 13, and is a manually operable switch.

Connected across the terminal 12 and the contact 18 of the switch is a solenoid 19 and, preferably, a capacitor 20 is placed in the line leading from the terminal 12 to the solenoid coil. The solenoid 19 is adapted to be energized when a current flows therethrough, and when energized will close the contacts 21 and 22 that complete a circuit through the coil of a solenoid 23. The leads 24 and 25 of that circuit are adapted to be connected to a source of power such as a 6 volt D.C. battery.

The plunger of the solenoid 23 is indicated by the numeral 26 and carries a contact bar 27. The contact bar 27, when the plunger 26 is moved inwardly upon energization of the solenoid, electrically connects the contacts 28 and 29 which are connected respectively through leads 30 and 31 to one side of the secondary windings 32 and 33 of an amplifier output transformer 34 having a primary winding 35.

The transformer 34 constitutes the output circuit of an amplifier 36, and the primary winding 35 of the transformer is connected to the amplifier through the leads 37 and 38. The amplifier 36 may be completely conventional and, therefore, is shown only in the form of a block in the drawing. Power for the amplifier 36 may be provided through the lines 39 and 40 which are adapted to be connected to an ordinary convenience outlet that provides 115-volts A.C. The amplifier input circuit is connected to a microphone 41 so that sound energy picked up by the microphone is amplified after conversion to electrical energy in the amplifier 36, and is impressed across the primary winding 35 of the transformer 34. A complementary voltage is induced in the secondary windings 32 and 33 of the transformer, and through leads 42 and 43 is impressed across the terminal 12 and contact 18 of the switch 17.

The solenoid 23 is a time release solenoid, so that when once energized it remains energized for a period of predetermined duration. Solenoids are available that function in such manner, and an exemplary solenoid of such character is shown in the drawing. It is there seen that the plunger 26 is biased outwardly, or away from the contacts 28 and 29, by a spring 44. The plunger is also connected to a time release device such as a dashpot 45 that will permit rapid movement of the plunger 26 toward the right (as viewed in the drawing) to close the contacts 28 and 29, but which will prevent rapid movement of the plunger in the opposite direction when the solenoid coil is de-energized. Rather, the dashpot maintains the plunger 26 in its closed position for a period of predetermined duration, and only upon expiration of such period does the biasing force of the spring 44 move the plunger to the left to open the contacts 28 and 29. Generally, hold-release arrangements such as the dashpot 45 are adjustable so that the time delay afforded thereby may be adjusted as desired.

In operation of the device, the switch 17 may either be positioned as shown in the drawing, or the movable blade thereof may be swung so as to connect the contact 16 with the terminal 13. In such position, the entire listening circuit will be disconnected from the telephone and the telephone will function in the usual and customary manner. That is to say, when the number of the phone is dialed the attention circuit will cause the telephone bell to ring, and the phone in all other respects will function and operate in the usual and conventional manner.

When the switch 17 is in the position illustrated, so that the terminal 13 is connected to the contact 18, the bell or attention circuit of the telephone will be disconnected, and when the dial signal appears as the result of someone dialing the number of the telephone a current will flow through the coil of the solenoid 19, energizing that coil and closing the contacts 21 and 22 thereof. At such time, the solenoid 23 is de-energized and the contacts 28 and 29 are opened as shown to break the circuit through the secondary windings 32 and 33 of the audio output transformer 34.

When the solenoid 19 is energized and the contacts 21 and 22 are closed, current will flow through the coil of the solenoid 23, energizing that solenoid and moving the plunger 26 to a position closing the contacts 28 and 29. The closure of those contacts will complete the circuit through the secondary windings 32 and 33 of the output transformer 34, and any voltage induced therein will be placed on the telephone lines 10 and 11 and thereby carried to the telephone from which the dialed signal originated. Thus, any sound picked up by the microphone 41 will be amplified in the amplifier 36, and through the transformer 34 and telephone lines 10 and 11 will be carried to the person who has dialed the telephone.

Upon discontinuance of the dial or calling signal, the solenoid 19 will be de-energized, breaking the contacts 21 and 22 and thereby de-energizing the solenoid 23. However, the contacts 28 and 29 will remain closed for the entire holding period for which the dashpot 45 has been set. Upon the expiration of that holding period, the spring 44 will draw the plunger 26 outwardly, opening the contacts 28 and 29 and thereby breaking the secondary winding circuit of the transformer 34. The circuit is then conditioned to receive a subsequent dial tone from a calling telephone to again initiate the cycle that has been described.

It will be appreciated that the device provides a ready means for surveying through sound indications the conditions existing at the premises where a telephone equipped with the listening device is located. The listening in is accomplished without alerting persons at the premises so that the conditions cannot be altered through alerting of any persons present there. At the same time, however, the listening device can be disconnected from the telephone so that the phone will function in the usual and conventional manner.

While in the foregoing specification an embodiment of the invention has been described in considerable detail for purposes of setting out in particularity the invention in an environmental setting, it will be appreciated that those skilled in the art may make numerous changes in such details without departing from the spirit and principles of the invention.

I claim:

1. In a listening device for use with a telephone instrument connected to telephone transmission lines over which current signals are transmitted to energize the bell-ringing circuit of the telephone instrument when the number thereof is dialed from a calling station, a normally deenergized solenoid for connection to such transmission lines and being characterized by its response to such current signals so as to be energized thereby, a coupling transformer having primary and secondary windings, audio signal means for location at the premises of such telephone instrument and being connected with one of said windings to effect a transfer of audio signals therebetween, normally open circuit means for connecting the other of said windings across such transmission lines, means comprising said solenoid for closing said circuit means upon energization of the solenoid to couple said audio signal means with such transmission lines and to also effect a termination of such current signals, and a normally open time delay switch closed when said solenoid is energized and independently returned to open position subsequent to deenergization of the solenoid.

2. In a listening device for use with a telephone instrument connected to telephone transmission lines over which current signals are transmitted to energize the bell-ringing circuit of the telephone instrument when the number thereof is dialed from a calling station, a normally deenergized solenoid for connection to such transmission lines and being characterized by its response to such current signals so as to be energized thereby, a coupling transformer having primary and secondary windings, audio signal means for location at the premises of such telephone instrument and being connected with one of said windings to effect a transfer of audio signals therebetween, normally open circuit means for connecting the other of said windings across such transmission lines, means comprising said solenoid for closing said circuit means upon energization of the solenoid to couple said audio signal means with such transmission lines and to also effect a termination of such current signals, a normally open time delay switch closed when said solenoid is energized and independently returned to open position subsequent to deenergization of the solenoid, said time delay switch comprising a solenoid connected in series with the contacts of said first mentioned solenoid and energized substantially concurrently therewith and a dashpot for effectuating the delay of said switch in the moevment thereof to open position.

3. In combination with a telephone instrument connected to telephone transmission lines over which current signals are transmitted to energize the bell-ringing circuit of the instrument when the number thereof is dialed from a calling station, a listening circuit comprising a solenoid connected to such transmission lines and being characterized by response to such current signals so as to be energized thereby, a manually manipulatable switch connected in series with said solenoid for selectively connecting said listening circuit or bell-ringing circuit of said instrument to said transmission lines, a coupling transformer having a primary and secondary winding, audio signal means located at the premises of said telephone instrument and being connected with one of said windings to effect a transfer of audio signals therebetween, circuit means in generally shunt connection with said solenoid and including the other of said windings to connect the same with said transmission lines, a time delay switch in series with said circuit means for normally maintaining the same in an open state, and means comprising said solenoid for closing said time delay switch upon energization of the solenoid to couple said audio signal means with said transmission lines and to also effect a termination of such current signals, said delay switch being returned to the open position thereof after a predetermined time interval subsequent to the deenergization of said solenoid.

References Cited in the file of this patent

UNITED STATES PATENTS

| | | |
|---|---|---|
| 2,065,642 | Bradford | Dec. 29, 1936 |
| 2,539,139 | Jordanoff | Jan. 23, 1951 |
| 2,786,099 | Beatty | Mar. 19, 1957 |
| 2,800,530 | Van Deventer | July 23, 1957 |